(12) United States Patent
Weldon et al.

(10) Patent No.: US 6,843,271 B2
(45) Date of Patent: Jan. 18, 2005

(54) FUEL TANK PRESSURE CONTROL VALVE INCLUDING AN INTEGRATED SENSOR

(75) Inventors: Craig Weldon, Chatham (CA); David W. Balsdon, Chatham (CA); Sudhir Parabdesai, Taylor, MI (US)

(73) Assignee: Siemens VDO Automotive, Inc., Chatham (CA)

( * ) Notice: Subject to any disclaimer, the term of this patent is extended or adjusted under 35 U.S.C. 154(b) by 0 days.

(21) Appl. No.: 09/923,789

(22) Filed: Aug. 8, 2001

(65) Prior Publication Data

US 2002/0088492 A1 Jul. 11, 2002

Related U.S. Application Data

(60) Provisional application No. 60/223,760, filed on Aug. 8, 2000, provisional application No. 60/232,348, filed on Sep. 14, 2000, provisional application No. 60/237,879, filed on Oct. 4, 2000, and provisional application No. 60/265,387, filed on Jan. 30, 2001.

(51) Int. Cl.[7] .......................... F16K 31/02; F16K 11/10; F02M 33/02
(52) U.S. Cl. ..................... 137/487.5; 137/557; 137/587; 137/630.22; 137/493; 251/129.22; 123/516
(58) Field of Search ...................... 137/1, 15.18, 487.5, 137/557, 587, 630, 630.22, 493, 493.9; 251/129.02, 129.22; 123/516, 518, 519, 520

(56) References Cited

U.S. PATENT DOCUMENTS

| | | | | |
|---|---|---|---|---|
| 1,620,720 A | * | 3/1927 | Buck ........................... | 137/513 |
| 4,483,369 A | | 11/1984 | Akagi et al. ........... | 137/625.12 |
| 5,211,151 A | * | 5/1993 | Nakajima et al. ........... | 123/520 |
| 5,259,355 A | * | 11/1993 | Nakashima et al. ........ | 123/520 |
| 5,267,470 A | * | 12/1993 | Cook .......................... | 73/49.7 |
| 5,280,775 A | * | 1/1994 | Tanamura et al. .......... | 123/518 |
| 5,284,121 A | * | 2/1994 | Abe et al. .................... | 123/520 |
| 5,363,828 A | * | 11/1994 | Yamashita et al. .......... | 123/520 |

(List continued on next page.)

OTHER PUBLICATIONS

U.S. Appl. No. 09/960,732, Craig Weldon et al., filed Sep. 24, 2001.
U.S. Appl. No. 09/960,718, Craig Weldon et al., filed Sep. 24, 2001.
U.S. Appl. No. 09/931,373, Craig Weldon et al., filed Aug. 17, 2001.

(List continued on next page.)

*Primary Examiner*—Ramesh Krishnamurthy

(57) ABSTRACT

A device for controlling fluid flow between an evaporative emission space of a fuel tank and a fuel vapor collection canister that includes a housing, a valve, a seal, an electric actuator, an electric transducer, and an electrical connector. The housing includes a first port, a second port, and a fluid flow path that extends between the first and second ports. The first port is adapted for receiving fluid flow from the evaporative emission space and is at a first pressure level. The second port is adapted for supplying fluid flow to the fuel vapor collection canister and is at a second pressure level. The valve is movable along an axis with respect to the housing between a first configuration, a second configuration, and an intermediate configuration between the first and second configurations. The first configuration permits substantially unrestricted fluid flow between the first and second ports. The second configuration prevents fluid flow between the first and second ports. The seal is located at an interface between the housing and the valve and includes an annular lip, which projects obliquely with respect to the axis in the first configuration of the valve. The electric actuator is disposed within the housing and is operatively coupled to the valve element. The electric transducer is disposed within the housing and is in fluid communication with the fluid flow path. The electric transducer senses the first pressure level. The electrical connector is disposed on the housing. The electrical connector includes a first set of terminals, which are in electrical communication with the electric actuator and a second set of terminals, which are in electrical communication with the electric transducer.

14 Claims, 2 Drawing Sheets

U.S. PATENT DOCUMENTS

| | | | | |
|---|---|---|---|---|
| 5,390,703 | A | | 2/1995 | Tengesdal ................... 137/629 |
| 5,579,741 | A | * | 12/1996 | Cook et al. ................. 123/516 |
| 5,629,660 | A | | 5/1997 | Kenyon et al. ............. 335/227 |
| 5,657,962 | A | * | 8/1997 | Neron et al. ................ 137/630 |
| 5,803,056 | A | * | 9/1998 | Cook et al. ................. 123/520 |
| 5,863,025 | A | * | 1/1999 | Noya .................... 251/129.17 |
| 6,021,997 | A | | 2/2000 | Hell ......................... 251/30.04 |
| RE36,600 | E | * | 3/2000 | Ito .............................. 123/520 |
| 6,196,258 | B1 | * | 3/2001 | Araki et al. ............. 137/493.4 |
| 6,298,731 | B1 | * | 10/2001 | Wade et al. .................. 73/756 |

OTHER PUBLICATIONS

U.S. Appl. No. 09/923,796, Craig Weldon et al., filed Aug. 8, 2001.

U.S. Appl. No. 09/923,792, Craig Weldon et al., filed Aug. 8, 2001.

U.S. Appl. No. 09/923,790, Craig Weldon et al., filed Aug. 8, 2001.

U.S. Appl. No. 09/923,788, Craig Weldon, filed Aug. 8, 2001.

U.S. Appl. No. 09/863,756, Craig Weldon et al., filed May 24, 2001.

PCT International Search Report; PCT/CA01/00771; Dec. 17, 2001.

* cited by examiner

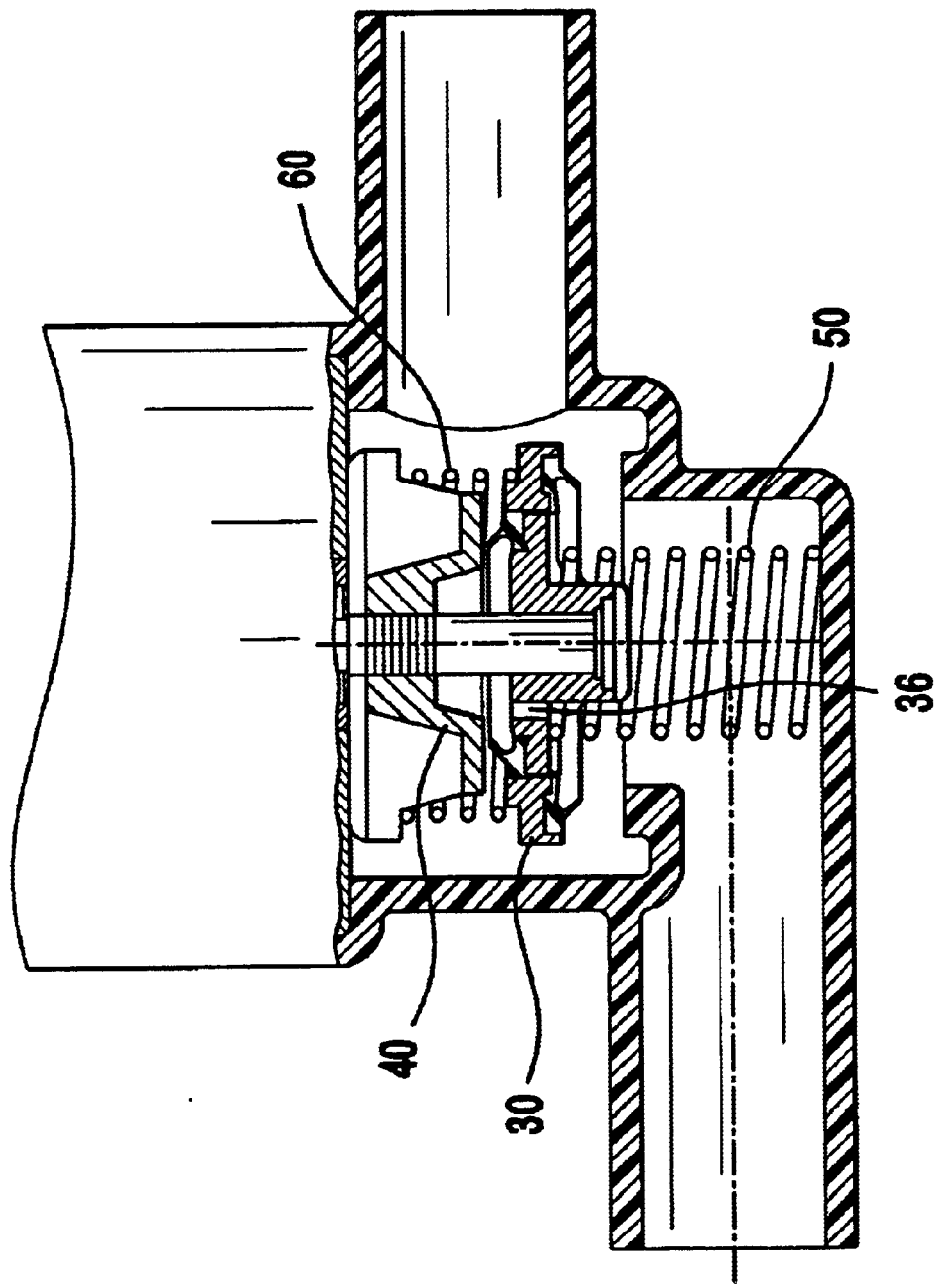

FUEL TANK PRESSURE CONTROL VALVE INCLUDING AN INTEGRATED SENSOR

CLAIM FOR PRIORITY

This application claims the benefit of the earlier filing dates of Provisional Application Nos. 60/223,760 (filed Aug. 8, 2000), 60/232,348 (filed Sep. 14, 2000), 60/237,879 (filed Oct. 4, 2000), and 60/265,387 (filed Jan. 30, 2001) which are hereby incorporated by reference in their entirety. This application also claims the benefit of U.S. patent application Ser. No. 09/863,756 (filed May 24, 2001), now U.S. Pat. No. 6,612,338.

FIELD OF THE INVENTION

This disclosure generally relates to a pressure control valve. In particular, this disclosure is directed to an electrically operated valve, including an integrated sensor and common electrical connector, to control the level of vapor pressure in a fuel tank of a vehicle.

BACKGROUND OF THE INVENTION

It is believed that prior to legislation requiring vehicles to store hydrocarbon vapors that are generated when refueling a vehicle, a simple orifice structure was used to maintain a positive pressure in a fuel tank to retard vapor generation. It is believed that such orifice structures could no longer be used with the advent of requirements controlling on-board refueling. It is believed that, on some vehicles, the orifice structure was simply deleted, and on other vehicles, the orifice structure was replaced with a diaphragm-actuated pressure relief valve. It is believed that these diaphragm-actuated valves suffer from a number of disadvantages including that the calibration (i.e., pressure blow-off level) changes with temperature and age.

It is believed that it is necessary on some vehicles to maintain an elevated pressure in the fuel tank to suppress the rate of fuel vapor generation and to minimize hydrocarbon emissions to the atmosphere. It is believed that under hot ambient temperature conditions or when the fuel is agitated, e.g., when a vehicle is operated on a bumpy road, the amount of fuel vapor generated can exceed the amount of fuel vapor that can be purged by the engine. It is believed that a carbon canister can become hydrocarbon saturated if these conditions occur and are maintained for an extended period. It is believed that such a hydrocarbon saturated carbon canister is unable to absorb the additional fuel vapors that occur during vehicle refueling, and that hydrocarbon vapors are released into the atmosphere. A legislated standard has been set for the permissible level of free hydrocarbons that may be released. A so-called "shed test" is used to measure the emission of the free hydrocarbons for determining compliance with the legislated standard.

It is believed that there is needed to provide a valve that overcomes the drawbacks of orifice structures and diaphragm-actuated pressure relief valves.

SUMMARY OF THE INVENTION

The present invention provides a device for controlling fluid flow between an evaporative emission space of a fuel tank and a fuel vapor collection canister that comprises a housing, a valve, a seal, an electric actuator, an electric transducer, and an electrical connector. The housing includes a first port, a second port, and a fluid flow path that extends between the first and second ports. The first port is adapted for receiving fluid flow from the evaporative emission space and is at a first pressure level. The second port is adapted for supplying fluid flow to the fuel vapor collection canister and is at a second pressure level. The valve is movable along an axis with respect to the housing between a first configuration, a second configuration, and an intermediate configuration between the first and second configurations. The first configuration permits substantially unrestricted fluid flow between the first and second ports. The second configuration prevents fluid flow between the first and second ports. The seal is located at an interface between the housing and the valve and includes an annular lip, which projects obliquely with respect to the axis in the first configuration of the valve. The electric actuator is disposed within the housing and is operatively coupled to the valve element. The electric transducer is disposed within the housing and is in fluid communication with the fluid flow path. The electric transducer senses the first pressure level. The electrical connector is disposed on the housing. The electrical connector includes a first set of terminals, which are in electrical communication with the electric actuator and a second set of terminals, which are in electrical communication with the electric transducer.

The present invention also provides a method of connecting a device for controlling fluid flow between an evaporative emission space of a fuel tank and a fuel vapor canister. The fuel tank and the fuel vapor canister are mounted on a vehicle and include fluid conduits and an electric wiring harness. The method comprises mounting a housing of the device on the vehicle; establishing a first fluid communication connection between the device and the evaporative emission space of the fuel tank; establishing a second fluid communication connection between the device and the fuel vapor collection canister; and establishing a single electrical connection between the wiring harness and both of a valve actuator and a pressure regulator that are commonly disposed within the housing of the device.

BRIEF DESCRIPTIONS OF THE DRAWINGS

The accompanying drawings, which are incorporated herein and constitute part of this specification, illustrate embodiments of the invention, and, together with the general description given above and the detailed description given below, serve to explain the features of the invention.

FIG. 2 is a sectional view of another embodiment of a fuel tank pressure control valve.

DETAILED DESCRIPTION OF THE PREFERRED EMBODIMENT

Figure 1:
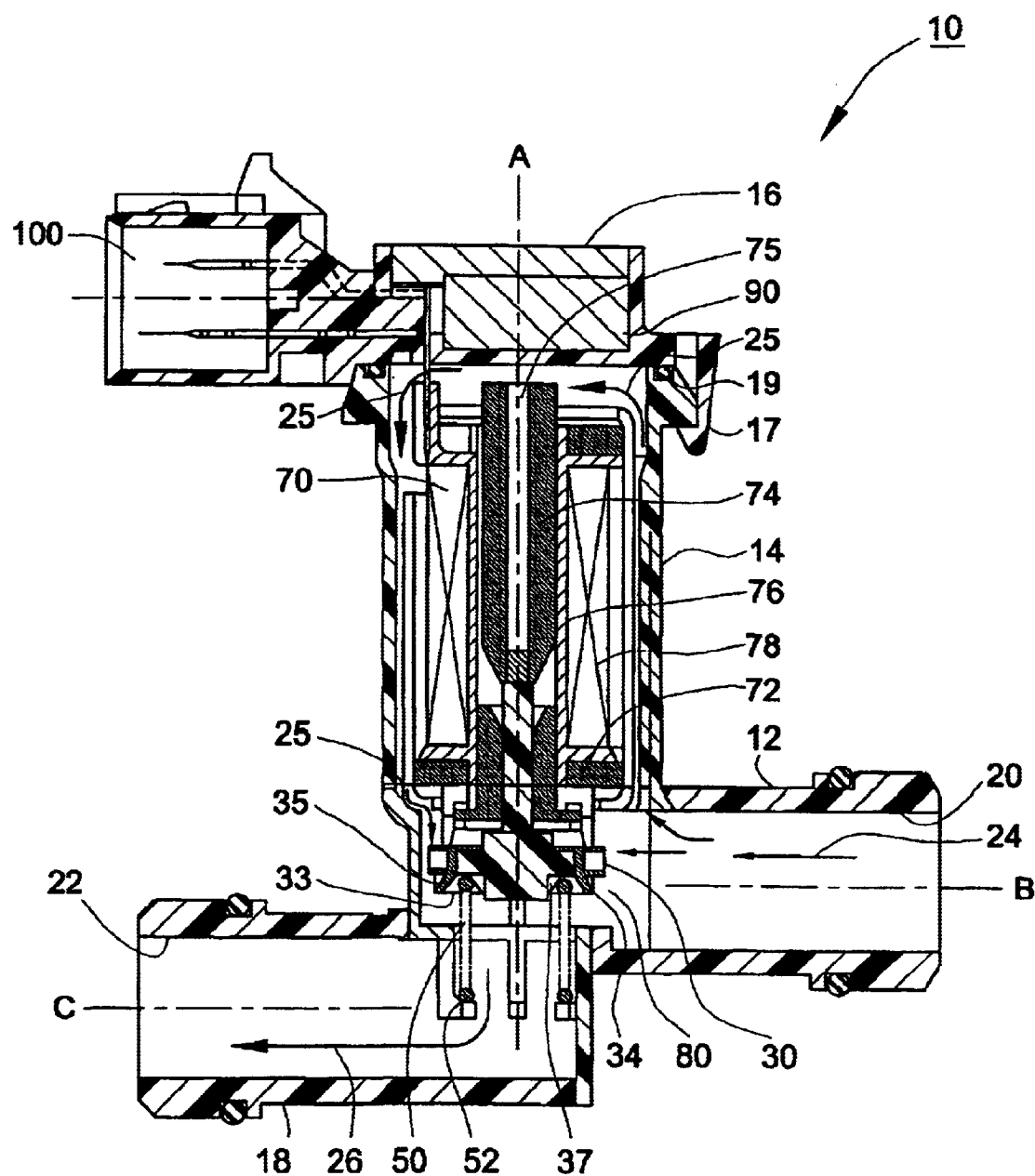
FIG. 1 is a sectional view of a fuel tank pressure control valve in a first configuration wherein fluid flow is permitted through a fluid flow path.

A fuel tank pressure control valve 10 can be located along a vapor line (not shown) connecting a fuel vapor dome, i.e., the gaseous portion within a fuel tank (not shown), and a charcoal canister (not shown). A canister purge control valve (not shown) can be used to purge hydrocarbons that have been collected in the charcoal canister (not shown). Typically, the hydrocarbons that are purged from the charcoal canister are combusted by an internal combustion engine (not shown).

A vapor dome pressure level that is approximately 10" water above atmospheric pressure has been determined to suppress fuel vapor generation in the fuel tank (not shown). A fuel tank pressure sensor (not shown) can be used to detect pressures in excess of this determined level. When excess pressure is detected, the fuel tank pressure control valve 10 is supplied an electrical signal, which results in the fuel tank pressure control valve 10 opening to decrease pressure to or slightly below the determined level.

The fuel tank pressure control valve 10 includes a housing, a valve assembly 80, a seal 30, an electric actuator 70, an electric transducer 90, and an electrical connector 100. The housing can include an inlet portion 12, a body portion 14, a cover portion 16, and an outlet portion 18. The body portion 14 extends along an axis A. The inlet portion 12 extends along an axis B, which can be substantially transverse to the axis A. The outlet portion 18 extends along an axis C, which can be substantially transverse to the axis A. As shown in the Figure, the inlet portion 12, which extends along the axis B can be substantially parallel to the outlet portion 18, which extends along the axis C. In another embodiment (not shown) the axis B and the axis C can be coincidental. The inlet and outlet portions 12,18 partially define a fluid communication path between an inlet port 20 and an outlet port 22. The fluid communication path includes an inlet communication path 24, an intermediate communication path 25, and an outlet communication path 26. The inlet portion 12 and the outlet portion 18 can be made of any material that is suitable for contacting and containing fuel and/or fuel vapor. The body portion 14 can be made of any material that is suitable for housing the actuator 70 and for contacting and containing fuel and/or fuel vapor. The cover portion 16 can be made of any material that is suitable for housing the electric transducer 90 and for contacting and containing fuel and or fuel vapor. The housing portions 12,14,16,18 can be made of different materials or the same material, as long as the material is suitable for its intended purpose. The housing portions 12,14,16,18 can be a homogenous whole or separate components coupled together, for example, by an interlocking flange assembly. Preferably, the inlet, body, and outlet portions 12,14,18 are a homogenous whole, and the body and cover portions 14,16 are separate components coupled together by an interlocking flange assembly 17. Alternative coupling techniques can be substituted for the interlocking flange assembly 17. A rubber O-ring 19 can provide a fluid-tight seal, which is impermeable to hydrocarbon migration, between the body and cover portions 14,16. Alternative sealing means, e.g., a gasket, can be substituted for the O-ring 19. The housing can be two separate halves of the inlet portion 12, the body portion 14, the cover portion 16, and the outlet portion 18 divided along the axis A. Preferably, the housing is as described above.

The inlet portion 12 extends from the inlet port 20 and defines the inlet communication path 24. The inlet port 20 provides a path for ingress of fuel vapor from the evaporative emission space of the fuel tank (not shown). The outlet housing portion 18 includes the outlet port 22 and defines the outlet communication path 26. The outlet port 22 provides a path for egress of fuel vapor to the carbon canister (not shown). Fluid communication between the inlet port 20 at an inlet pressure level and the outlet port 22 at an outlet pressure level can be through the inlet fluid communication path 24, the intermediate fluid communication path 25, and the outlet fluid communication path 26. The inlet pressure level can be less than an ambient pressure level, and the outlet pressure level can be greater than the ambient pressure level. Fluid flow through the inlet communication path 24 and the outlet communication path 26 is controlled by the valve assembly 80. As used herein, the term "fluid" can refer to a gaseous phase, a liquid phase, or a mixture of the gaseous and liquid phases. The term "fluid" preferably refers to the gaseous phase, i.e., fuel vapor.

The valve assembly 80 is movable along the axis A with respect to the housing between an open configuration, a closed configuration, and an intermediate configuration. The intermediate configuration is between the open and closed configurations. As shown in the Figure, the open configuration permits substantially unrestricted fluid flow between the inlet and outlet ports 20,22. The closed configuration (not shown) substantially isolates fluid flow between the inlet and outlet ports 20,22. The intermediate configuration provides restricted fluid flow, i.e., reduced from unrestricted flow, between the inlet and outlet ports 20,22.

The seal 30 includes at least one orifice (not shown) and is disposed at an interface between the housing and the valve assembly 80. The seal 30 can include a distal annular extension 34, which projects obliquely with respect to the axis A in the open configuration. In the intermediate configuration when the seal contacts or is in close proximity to the interface, the single seal element can deform in response to a differential between the inlet pressure level at the inlet port 20 and the outlet pressure level at the outlet port 22 such that there is restricted, i.e., reduced, fluid flow between the inlet and outlet ports 20,22. The at least one orifice (not shown) provides a flow path between the inlet and outlet ports 20,22 in the open and intermediate configurations. The annular extension 34 may be a hollow frustum that includes an inner surface 33, an outer surface 35, and a tip 37 disposed between the inner and outer surfaces 33,35. The inner surface 33 is in fluid communication with the outlet port 22 when the tip 37 contacts the housing. The outer surface is in fluid communication with the inlet port 20 when the tip 37 contacts the housing. The seal 30 engages an internal surface of the housing in the closed and intermediate configurations.

A resilient element 50, e.g., a coil spring that can be centered around the axis A, extends between the valve assembly 80 and a locator 52 disposed on an internal wall of the outlet housing portion 18. The distal resilient element 50 biases the valve assembly 80 toward the open configuration in opposition to the actuating force of the actuator 70. An alternate embodiment (not shown) can include a second resilient element (not shown) that biases a two-stage valve assembly (not shown). Preferably, the single resilient element 50 biases the single-stage valve assembly 80.

The actuator 70 is disposed within the body portion 14 of the housing and is operatively connected to the valve assembly 80. The actuator 70 displaces the valve assembly 80 from the open configuration to the closed configuration. The actuator 70 includes a stator 72, the armature 74, a bobbin 76, and a winding 78. For example, the actuator 70 can be electromagnetic, piezoelectric, or any other type of actuator. Preferably, the actuator 70 is an electromagnetic solenoid. The armature 74 is operatively connected to the valve assembly 80 and provides a first magnetic pole. The stator 72 provides a second magnetic pole to which the first magnetic pole can be attracted. The bobbin 76 surrounds the stator 72 and provides a wire form. A gap formed between an inner wall of the body portion 14 and an outer surface of the actuator 70 forms at least one channel 73, thus defining the intermediate fluid communication path 25. The at least one channel 73 can be oblique to the axis A. Preferably, the at least one channel 73 can extend substantially parallel to the axis A. The at least one channel 73 partially defines the intermediate fluid communication path 25. Fluid flow through the at least one channel 73 provides cooling for the actuator 70. The winding 78 includes a plurality of wire loops on the wire form. The stator 72 is fixed with respect to the body 14, and the armature 74 is displaceable along the axis A with respect to the stator 72. The stator 72 supports a bearing that guides a shaft 75 which connects the armature 74 and the proximate valve element 40.

The electric transducer 90 is disposed within the cover portion 16 of the housing and is in fluid communication with the intermediate flow path 25. The electric transducer 90 senses the inlet pressure level. The electric transducer 90 can provide a first electric signal used in controlling the actuator 70. The first electric signal can be a feedback signal. The electric transducer 90 can provide a second electric signal, which can be adapted to indicate a rollover condition of the fuel tank (not shown).

The electrical connector 100 is disposed within the cover portion 16 of the housing proximate the electric transducer 90. The electrical connector 100 includes a first set of terminals and a second set of terminals. The first set of terminals is in electrical communication with the actuator 70, and the second set of terminals is in electrical communication with the electric transducer 90. The electrical connector 100 can also include a third set of terminals, which is in electrical communication with both the actuator 70 and the electric transducer 90. The electric transducer 90 provides the first electric signal to a first subset of the second set of terminals of the electrical connector 100. The electric transducer 90 provides the second electric signal to a second subset of the second set of terminals of the electrical connector 100. The first and second subsets can include, in common, at least one of the second set of terminals.

There are a plurality of configurations of the distal and the proximate valve elements 30, 40 with respect to the housing. The open configuration, as shown in the Figure, permits substantially unrestricted fluid flow from the inlet port 20 to the outlet port 22. In the open configuration, the distal valve element 30 is spaced from the inlet housing portion 12 such that fluid communication is permitted through the inlet fluid communication path 24 through a gap between the distal valve element 30 and the inlet housing portion 12, through the at least one orifice 36 penetrating the distal valve element 30, through the intermediate fluid communication path 25, and through the outlet fluid communication path 26.

The closed configuration (not shown) substantially isolates fluid flow from the inlet port 20 to the outlet port 22. In the closed configuration (not shown), the distal seal 32 engages the internal surface of the inlet housing portion 12 such that the gap of the inlet fluid communication path 24 is closed. The proximate valve element 40 engages the seal member 32,34, thus preventing flow through the at least one orifice. In particular, the proximate valve element 40 is positioned with respect to the distal valve element 30 such that the intermediate and outlet fluid communication paths 25,26 are closed. To achieve this position, the proximate valve element 40 is displaced by the actuator 70 along the axis A toward the distal valve element 30.

In the closed configuration (not shown), if fuel tank pressure becomes too large, e.g., through burst pressure, agitation, hot ambient conditions, etc., the distal and proximate valve elements 30,40 permit flow of fuel vapor from the inlet port 20 to the outlet port 22. The release of pressure provides a blow-off feature. This is achieved because the pressure acting on the distal and proximate valve elements 30,40 is greater than the force of the actuator 70, the proximate resilient element 60, and the distal resilient element 50. When this occurs, the distal valve element 30 is spaced from the inlet housing portion 12 and the proximate valve element 40 is spaced from the distal valve element 30. Thus, fluid communication is permitted through the gap and the at least one orifice.

The intermediate configuration (not shown) provides restricted fluid flow from the inlet port 20 to the outlet port 22. In the intermediate configuration, the distal seal 32 engages the inlet housing portion 12 such that the gap is closed, and the proximate valve element 40 is positioned away from the proximate seal 34 such that fluid communication is permitted through the outlet fluid communication path 26, i.e., through the at least one orifice. The intermediate configuration occurs at an intermediate position between the open and closed configurations.

The actuator 70, e.g., an electromagnetic solenoid, operates through a power device, which can be a constant current driver or a pulse-width-modulated signal, such that there is an approximately fifty percent power level when the valve 10 is in the intermediate configuration. Thus, when the actuator 70 is not energized, the inlet, intermediate, and outlet fluid communication paths 24,25,26 allow fluid flow therethrough. This also provides a fail-safe condition such that fuel vapor build-up is prevented in the fuel tank. At an approximately zero percent power level, the valve 10 is in the open position, and at an approximately one hundred percent power level, the valve 10 is in the closed configuration.

This fuel tank pressure control valve 10 provides low flow restriction during fuel tank re-fueling (i.e., in the open configuration), fails to an open state (i.e., the open configuration), and provides restricted flow during routine vehicle operation to ensure that a sufficient vapor pressure is maintained to suppress additional fuel vapor generation (i.e., the intermediate configuration). During carbon canister purging (i.e., the closed configuration) excess hydrocarbons stored in the canister are purged to an internal combustion engine. Thus, fuel tank pressure control valve 10 isolates the fuel tank, thereby preventing purging directly from the evaporative emission space of the fuel tank. Isolating the fuel tank, therefore, prevents or reduces the amount of hydrocarbons in tail-pipe emissions.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A device for controlling fluid flow between an evaporative emission space of a fuel tank and a fuel vapor collection canister, the device comprising:

a housing having a body portion and a cover portion, the body portion including a first port, a second port, and a fluid flow path extending between the first and second ports, the first port being adapted for receiving fluid flow from the evaporative emission space and being at a first pressure level, and the second port being adapted for supplying fluid flow to the fuel vapor collection canister and being at a second pressure level;

a valve movable along an axis with respect to the housing between a first configuration, a second configuration, and an intermediate configuration between the first and second configurations, the first configuration permitting substantially unrestricted fluid flow between the first and second ports, and the second configuration substantially preventing fluid flow between the first and second ports;

a seal being located at an interface between the housing and the valve, the seal including an annular lip projecting obliquely with respect to the axis in the first configuration of the valve;

an electric actuator being disposed within the housing and extending between a first end operatively coupled to the valve and a second end;

an electric transducer being disposed proximate the second end of the actuator within the cover portion and in fluid communication with the fluid flow path, the electric transducer sensing the first pressure level and providing a first electric signal used in controlling the electric actuator, wherein the first pressure level comprises a negative pressure relative to ambient, and the first electric signal is provided to a first subset of the second set of terminals; and an electrical connector being disposed within the cover portion, the electrical connector including a first set of terminals in electrical communication with the electric actuator and including a second set of terminals in electrical communication with the electric transducer.

2. The device according to claim 1, wherein the electrical connector comprises a third terminal in common electrical communication with both the electric actuator and the electric transducer.

3. The device according to claim 1, wherein the first electric signal comprises a feedback signal.

4. The device according to claim 1, wherein the electric transducer provides a second electric signal adapted to indicate a rollover condition of the fuel tank.

5. The device according to claim 4, wherein the first pressure level comprises a positive pressure relative to ambient, and the second electric signal is provided to a second subset of the second set of terminals.

6. The device according to claim 5, wherein the first and second subsets comprise in common at least one of the second set of terminals.

7. The device according to claim 1, wherein the electric actuator comprises an electromagnetic solenoid.

8. The device according to claim 1, wherein the seal comprises a hollow frustum including an inner surface, an outer surface, and a tip disposed between the inner and outer surfaces, the inner surface being in fluid communication with the first port when the tip contacts the housing, and the outer surface being in fluid communication with the second port when the tip contacts the housing.

9. A device for controlling fluid flow between an evaporative emission space of a fuel tank and a fuel vapor collection canister, the device comprising:

a housing including a first port, a second port, and a fluid flow path extending between the first and second ports, the first port being adapted for receiving fluid flow from the evaporative emission space and being at a first pressure level, and the second port being adapted for supplying fluid flow to the fuel vapor collection canister and being at a second pressure level;

a valve movable along an axis with respect to the housing between a first configuration, a second configuration, and an intermediate configuration between the first and second configurations, the first configuration permitting substantially unrestricted fluid flow between the first and second ports, and the second configuration substantially preventing fluid flow between the first and second ports;

a seal being located at an interface between the housing and the valve, the seal including an annular lip projecting obliquely with respect to the axis in the first configuration of the valve;

an electric actuator being disposed within the housing and operatively coupled to the valve;

an electric transducer being disposed within the housing and in fluid communication with the fluid flow path, the electric transducer sensing the first pressure level and providing a first electric signal used in controlling the electric actuator, wherein the first pressure level comprises a negative pressure relative to ambient, and the first electric signal is provided to a first subset of the second set of terminals;

an electrical connector being disposed on the housing, the electrical connector including a first set of terminals in electrical communication with the electric actuator and including a second set of terminals in electrical communication with the electric transducer; and a first resilient element biasing the valve toward the first configuration.

10. A device for controlling fluid flow between an evaporative emission space of a fuel tank and a fuel vapor collection canister, the device comprising:

a housing including a first port, a second port, and a fluid flow path extending between the first and second ports, the first port being adapted for receiving fluid flow from the evaporative emission space and being at a first pressure level, and the second port being adapted for supplying fluid flow to the fuel vapor collection canister and being at a second pressure level;

a valve movable along an axis with respect to the housing between a first configuration, a second configuration, and an intermediate configuration between the first and second configurations, the first configuration permitting substantially unrestricted fluid flow between the first and second ports, and the second configuration substantially preventing fluid flow between the first and second ports, wherein the valve comprises a first valve element including at least one orifice, the at least one orifice providing the restricted fluid flow between the first and second ports, and a second valve element positionable between first and second arrangements with respect to the first valve element, the first arrangement of the second valve being spaced from the first valve element in the intermediate configuration, and the second arrangement of the second valve engaging the first valve element in the second configuration;

a seal being located at an interface between the housing and the valve, the seal including an annular lip projecting obliquely with respect to the axis in the first configuration of the valve;

an electric actuator being disposed within the housing and operatively coupled to the valve;

an electric transducer being disposed within the housing and in fluid communication with the fluid flow path, the electric transducer sensing the first pressure level; and an electrical connector being disposed on the housing, the electrical connector including a first set of terminals in electrical communication with the electric actuator and including a second set of terminals in electrical communication with the electric transducer.

11. The device according to claim 10, further comprising:

a first resilient element biasing the valve toward the first configuration; and a second resilient element biasing the first and second valve elements toward the first arrangement.

12. The device according to claim 11, wherein the second resilient element comprises a greater biasing force than the first resilient element.

13. The device according to claim 11, wherein the first and second resilient elements comprise coil springs having coincidental central axes.

14. A device for controlling fluid flow between an evaporative emission space of a fuel tank and a fuel vapor collection canister, the device comprising:

a housing having a body portion and a cover portion, the body portion including a first port, a second port, and a fluid flow path extending between the first and second ports, the first port being adapted for receiving fluid flow from the evaporative emission space and being at a first pressure level, and the second port being adapted for supplying fluid flow to the fuel vapor collection canister and being at a second pressure level;

a valve movable along an axis with respect to the housing between a first configuration, a second configuration, and an intermediate configuration between the first and second configurations, the first configuration permitting substantially unrestricted fluid flow between the first and second ports, and the second configuration substantially preventing fluid flow between the first and second ports;

a seal including an annular lip projecting obliquely with respect to the axis in the first configuration of the valve, the seal being located at an interface between the housing and the valve, wherein the seal in the intermediate configuration deforms in response to a differential between the first and second pressure levels;

an electric actuator being disposed within the housing and extending between a first end operatively coupled to the valve and a second end;

an electric transducer being disposed proximate the second end of the actuator within the cover portion and in fluid communication with the fluid flow path, the electric transducer sensing the first pressure level; and an electrical connector being disposed within the cover portion, the electrical connector including a first set of terminals in electrical communication with the electric actuator and including a second set of terminals in electrical communication with the electric transducer.

* * * * *